Figure 1:
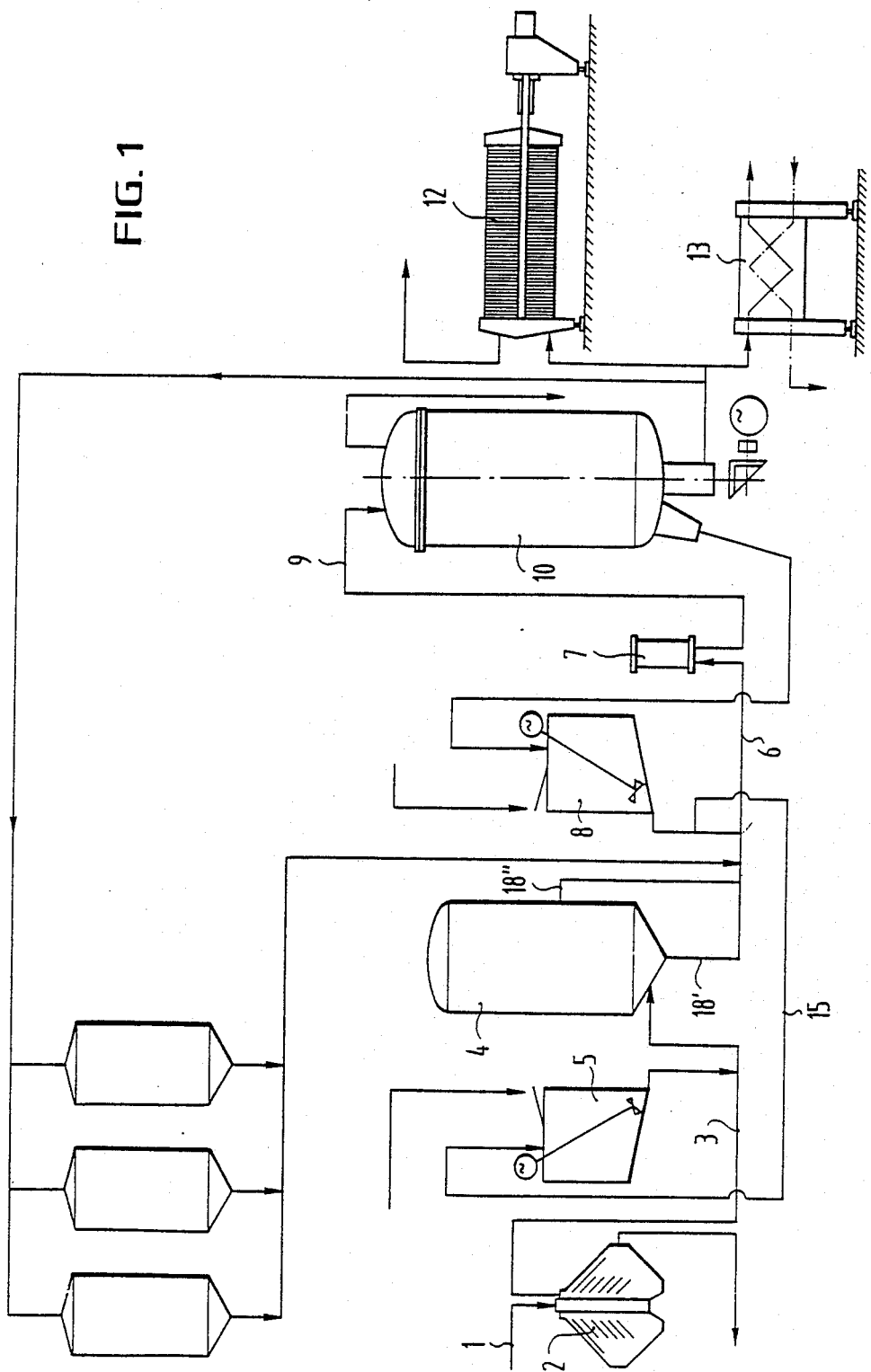

United States Patent [19]

Hums et al.

[11] Patent Number: 4,910,182

[45] Date of Patent: Mar. 20, 1990

[54] PROCESS FOR THE SECONDARY PURIFICATION AND STABILIZATION OF LIQUIDS CONTAINING POLYPHENOLS AND/OR PROTEINS, PARTICULARLY BEVERAGES AND MORE ESPECIALLY BEER

[75] Inventors: Norbert Hums, Landshut; Helmut Schafft, Mögglingen, both of Fed. Rep. of Germany

[73] Assignee: Westfalia Separator AG

[21] Appl. No.: 275,273

[22] Filed: Nov. 23, 1988

Related U.S. Application Data

[62] Division of Ser. No. 946,571, Nov. 19, 1986, Pat. No. 4,820,420.

[30] Foreign Application Priority Data

Mar. 19, 1985 [DE] Fed. Rep. of Germany ....... 3509892

[51] Int. Cl.$^4$ ............................................. B01J 20/26
[52] U.S. Cl. .................................... 502/402; 502/404
[58] Field of Search ............... 210/669, 670, 691, 692, 210/502.1; 426/422, 423, 490; 502/402, 404

[56] References Cited

U.S. PATENT DOCUMENTS

| | | | |
|---|---|---|---|
| 3,867,551 | 2/1975 | Jaegle | 426/11 |
| 3,940,498 | 2/1976 | Butterworth et al. | 426/12 |
| 3,941,718 | 3/1976 | Barabas et al. | 502/402 X |
| 4,571,390 | 2/1986 | Sakagami et al. | 502/402 |

*Primary Examiner*—Patrick P. Garvin
*Attorney, Agent, or Firm*—Davis, Bujold & Streck

[57] ABSTRACT

The present invention concerns a process for secondary purification and stabilization of liquids containing polyphenols and/or proteins. The liquid to be treated is first subjected to a centrifuge, or similar apparatus, which performs the primary purification of the liquid. The treated liquid is then mixed with stabilizing means that adsorb the polyphenols and proteins and filter means that retain the fine turbidities contained within the liquid. The liquid mixture is then transferred to an alluvial filter apparatus in laminar flow wherein the filter means and stabilization means along with the adsorbed polyphenols and proteins form a filter cake. The purified liquid is then transported to subsequent treatment while the filter cake is subsequently treated with a solution which dissolves the polyphenols and protein thereby regenerating the stabilization means and the filter means.

11 Claims, 2 Drawing Sheets

PROCESS FOR THE SECONDARY PURIFICATION AND STABILIZATION OF LIQUIDS CONTAINING POLYPHENOLS AND/OR PROTEINS, PARTICULARLY BEVERAGES AND MORE ESPECIALLY BEER

This is a divisional of co-pending application Ser. No. 946,771 filed on Nov. 19, 1986 and now U.S. Pat. No. 4,820,420.

The invention concerns a process for secondary purification and stabilization of liquids containing polyphenols and/or proteins, particularly beverages and more especially beer.

The centrifugation of liquids, especially beverages, has been known and practiced to a great extent to separate components from the liquid that have become insoluble during the process. But this kind of solid-liquid separation can be used only when a density difference between the liquid and the solid is sufficiently great and the substance to be separated has a starting stable texture that does not disintegrate as result of the high shearing stresses appearing in the centrifugation, that is, for instance, particles having colloidal structures result.

However, the turbidities present in the beer as agglomerates of polyphenol and protein have the property of easily disintegrating into particles of colloidal structure during the centrifugation so that they can be removed only to an insufficient extent by centrifugation. When the beer is stored after the centrifugation, these disintegrated agglomerates again form and cloud the beer.

The use of a centrifuge has been tested for purifying beer since it would make possible a very economic purification, but in the practice it could not succeed for the reasons mentioned above Another kind of primary purification of the beer that is generally carried out consists of continuously treating the clouded beer ready for bottling with filter means such as kieselguhr, perlites, cellulose and the like, and separating the filter means in a filter utensil in which a corresponding cake builds up. The disadvantage here is that the filter means cannot be regenerated, accumulates as waste, and to a great extent burden the deposits. Besides, it is important to note that different kinds of kieselguhr contain portions of christobalite which is harmful to health.

Therefore, kieselguhr filters (alluvial filters) require disposable filter means for their use. They have a relatively elevated need of water and additionally burden the waste water with beer-water mixtures and kieselguhr residues. The consumed kieselguhr slurries pose another problem due to the bad smell during transportation and sedimentation of the deposits. Therefore, a solution has been sought for years to find a way in order to eliminate as far as possible kieselguhr filtration. But hitherto, all efforts have been unsuccessful.

A stabilization of the beer by adding stabilization means adsorbent of polyphenols such as polyvinyl polypyrrolidone (PVPP), for instance "Polyclar AT" (see DE-OS No. 15 17 874), in combination with stabilization means adsorbent of proteins, such as hydrogel, has been known and carried out after the purification step. In particular, the costly PVPP can be regenerated by adding tempered lye solutions which can dissolve and thereby selectively remove both the hydrogels and the adsorbed proteins and polyphenols (DE-OS No. 26 48 978, H. Schafft, in "Brewery Industry", Number 4, 1979, Dr. Hums "Monthly Publications for Breweries", No. 34, p. 83 to p. 85, 1981). It is also usual (see DE-OS No. 19 07 610) to employ filter means and stabilization means together in a throw-away operation.

According to the invention, it has now been surprisingly found that it is economically possible to use a centrifuge for the purification of beer when beer that has undergone primary purification with the centrifuge is then treated with stabilization means and filter means.

Therefore, in a recycling process for combining the secondary purification and the stabilization of liquids containing polyphenols and/or proteins according to the invention, especially beer, wine, or similar beverages, the liquid to be treated is first subjected to primary purification with a centrifuge. The centrifuged product, mixed with a mixture of stabilization adsorbent means of polyphenols and proteins and filter means that retain fine turbidities, is then transferred as suspension to an apparatus adequate for retaining solids. The solid cake that forms in the solids retaining apparatus is regenerated after terminating the treatment of the liquid in order to recover the filter means and the regeneratable stabilization means. These are then used for another treatment of liquid.

The process according to the invention thus allows, for the first time in the practice, a null-value use of a centrifuge instead of the usual filter device for beer purification, since the turbidities that cannot be separated by centrifugation are either mechanically or adsorptively retained in the solids retaining apparatus.

With the process according to the invention, it is therefore possible to carry out, instead of the kieselguhr filtration which is burdened with waste water and deposits, a separation of the beer that works to a great extent without any loss in an economical manner and doing justice to quality.

To change over from a traditional purification sequence to the process according to the invention, there is needed, on the one hand, a centrifuge and on the other, a stabilization and regeneration installation. But the latter already exists in most breweries. Under certain circumstances, an existing kieselguhr filter device (horizontal boiler filter) can also be converted to such a stabilization and regeneration installation. It is essential in the process according to the invention that the prevalent and particularly costly stabilization means, such as polyvinyl polypyrrolidone (PVPP), and the filter means can be regenerated and re-used without limit. The second component of the stabilization means, namely the silica gel, is on the one hand more economic and on the other can be used much more sparingly than in the traditional process since it is added to the beer that has already undergone primary clarification in the centrifuge. But especially, the action of the silica gel for removing proteins is incomparably stronger for removing proteins in combination with PVPP than when used without PVPP. That is, the consumption of silica gel in comparison with the known process is reduced by 70% or more.

However, the greatest savings in the process according to the invention result in substituting a centrifuge for kieselguhr filtration. The centrifuge is actually a separating and purifying instrument that works almost without losses.

The problem in purifying beers with a centrifuge hitherto consisted in that it was necessary to come with terms with a widely extended colloidal area ranging from particle sizes of more than 1 $\mu$m to genuine solutions (about $10^{-3}$ μm). If the difference between the density of the solution and the solid particles is very small, or there is no difference, then a separation with a centrifuge is not possible at all or hardly possible.

This problem has formerly stood opposed to replacing the kieselguhr filtration with the centrifuge, especially since it is precisely this inseparable colloidal area that is decisive for the chemophysical or colloidal stability and for the required brightness of the beer. By means of the process according to the invention, this colloidal area is perfectly incorporated therefore preserving clearness.

By eliminating the kieselguhr filtration, in the process according to the invention, quite considerable amounts of wash water and beer are also saved. In the kieselguhr filtration, so-called transition losses actually appear (beer-water mixtures). Furthermore, compared to kieselguhr filtration equipment, the centrifuge used according to the invention operates more reliably and can be more easily serviced.

The centrifuge used according to the invention is preferably equipped with a control for the automatic removal of the turbidities. It can also be applied to a second use in breweries such as at night for an intermediate purification from the storage to the aging tank. In the aggregate of a purification chain, the automation of the centrifuge requires only the control of a drive and two adjusting elements (inlet and outlet).

Besides, the turbidities discharged from the centrifuge are valuable and vitamin-rich foodstuffs since they are predominantly composed of yeast and protein. The turbidities discharged can be collected in a reservoir. They are pumpable and thus easy to transport.

In the process, kieselguhr, perlite, cellulose and synthetic fibers or granulated cellulose or synthetic materials are used as filter means. A mixture of said fibers or granulated materials is also possible. In the case of synthetic fibers, they consist preferably of polyamides, halogenated polyethylene and/or polypropylene or polytetrafluoroethylene. The fibers, especially the cellulose fibers have lengths between 1 and 5000 μm and at the same time thicknesses from 17 to 40 μm. The preferred length is from 10 to 200 μm and about 20 μm for the thickness. The cellulose fibers preferably consist here of high-purity alpha cellulose.

Together with the above mentioned PVPP for the adsorption of polyphenols, are silica gel or silica sol, gelatin or bentonite used as stabilization means for the adsorption or precipitation of proteins. A preferred mixture of the stabilization and filter means is a mixture of PVPP, silica gel, cellulose and synthetic fibers. Said mixture is preferably homogenized in dry state so as to avoid mixing errors when used. An addition of kieselguhr is possible.

The above mentioned regeneration of the stabilization and filter means can also be affected under the action of heat, for instance, by using a 0.3 to 5% by weight, preferably from 1 to 2% by weight, of aqueous sodium hydroxide and/or soda solution as an alkaline liquid at a temperature of up to 90° C., preferably from 40° to 70° C.

Figure 2:
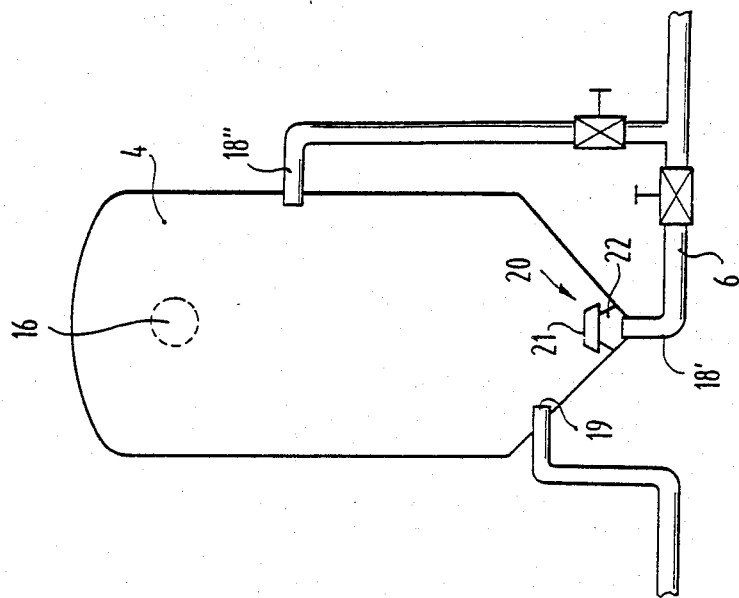
Figure 3:
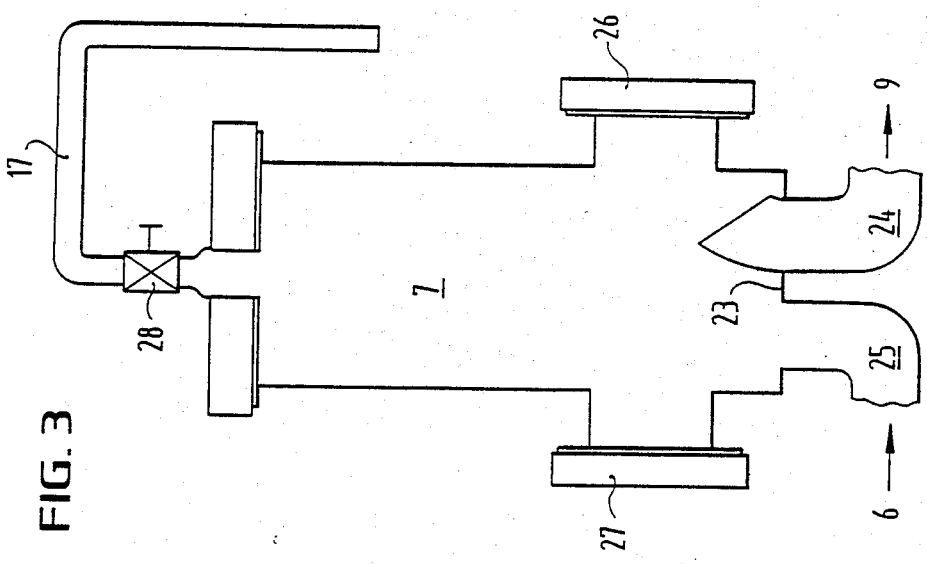

Herebelow the invention is explained in detail with reference to the enclosed drawing, wherein:

FIG. 1 diagrammatically shows an embodiment of an installation for carrying out the process according to the invention for secondary purification and stabilization of beer;

FIG. 2 diagrammatically shows and embodiment of the buffer tank of the installation; and FIG. 3 shows an embodiment of the liquid-mixer apparatus of the installation.

According to FIG. 1, the beer to be subjected to secondary purification and stabilization is fed via the inlet 1 of a centrifuge 2 intermittently stopped in order to remove the residue (turbidities).

The centrifuged product flows from the centrifuge 2 via a pipe 3 to a buffer tank 4. Via a first dosing device 5, silica gel is fed as first stabilization means, serving for the adsorption of proteins, to the pipe 3 between the centrifuge 2 and the buffer tank 4.

From the buffer tank 4, the centrifuged product compounded with silica gel flows via a pipe 6 to a liquid mixer 7. A mixture of filter means (such as cellulose and synthetic fibers) and one or more polyphenol-adsorbing stabilization means such as PVPP is fed to the beer from a second dosing device 8, between the buffer tank 4 and the liquid mixer 7, for combined filtration and chemophysical stabilization.

From the liquid mixer 7, the beer is fed via a pipe 9 to an alluvial filter apparatus 10. From the alluvial filter apparatus 10, the beer then goes via the outlet 11 or 11' to the subsequent biological treatment by means of a sterilizing filter apparatus 12 or a pasturization apparatus 13. The filter means and the stabilization means, with the colloidal and adsorbed polyphenols and proteins adhering thereto, are on the other hand retained by the alluvial filter apparatus 10. The beer compounded with the stabilization means and filter means must be passed into the alluvial filter apparatus 10 in a laminar current to make possible the quick undisturbed formation of filter cake.

To regenerate the filter means and the regeneratable stabilization means such as the PVPP, a 1 to 2% by weight NaOH solution at a temperature from 50° to 60° C. centigrade is fed to the alluvial filter apparatus 10 via a pipe not shown. Thereby the proteins and polyphenols of the filter cake become dissolved. They are discharged via a pipe not shown in FIG. 1. The sterilizing filter apparatus 12 or the pasturization apparatus 13 are of course separated from the alluvial filter apparatus during the regeneration.

The silica gel becomes likewise dissolved and thus also goes off during the regeneration. However, the filter means and the PVPP retained in the alluvial filer apparatus 10 remain during the NaOH treatment in the alluvial filter apparatus 10. They are washed with water and then fed again via a pipe not shown in FIG. 1, to the second dosing device 8. In addition, a partial current of the apparatus 8 can be fed to the first dosing device 5 via the pipe 15 shown in FIG. 1. In addition, the buffer tank 4 and the liquid mixer 7 are prestressed with carbon dioxide via a pipe 16 or 17 respectively.

As can be particularly seen in FIG. 2, the buffer tank 4 is formed by a cylindrical pressure tank, the lower section of which tapers conically downwardly into an outlet opening 18' to which the pipe 6 is attached. In the area of the conical lower section of the pressure tank, a tangentially oriented inlet opening 19 attached to the pipe 3 is provided in such a manner that a cyclone-like flow results in this section. In this manner, the partial current of the pipe 15 that contains the stabilization means fed via the dosing device 5 or the stabilization means fed via the dosing device 8 and the filter means is intimately spun with the centrifugation product in the buffer tank 4 and carried on via the outlet opening 18'' situated thereon. The amount of liquid in the buffer tank 4 is here controlled in a manner such that the stabilization means and/or filter means used react sufficiently with the proteins, polyphenols, protein-polyphenol compounds and others contained in the beer to form agglomerates, add can most extensively adsorb them. At the minimum, the filling height of the buffer tank 4 is controlled so that the brief discharge cycles of the centrifuge 2 re recovered and a continuous flow is retained. The residual volume in the buffer tank 4 is held under pressure with $CO_2$ via the pipe 16 with regard to the carboxylic acid contained in the beer. Via the lower outlet opening 18', a device 20 is provided at a distance for preventing the expansion of gas in the outlet opening 18' when the buffer tank 4 is emptied. Said device can be formed by a frusto-conical dome 21 having its opening downwardly oriented and fastened to the pressure tank by spacers 22.

As it can be especially seen in FIG. 3, the liquid mixer 7 is formed by a cylindrical vessel to which in the lower base 23, a discharge inlet connecting piece 24 and outlet connecting piece 25 are respectively attached to the pipes 6 and 9.

There are further provided two sight glasses 26 and 27 in the cylindrical peripheral wall of the liquid mixer 7. The inlet connecting piece 24 is here bent toward the sightglass 27. The sight glass 26 and the sight glass 27 can also be integrated in a turbidity measuring device. A control of the intermixture in the liquid mixer 7 is ensured by the sight glass 26 or a similar device for measuring the turbidity. In addition, the turbidity measuring device can be built in a manner such that the dosing device 5 and/or the dosing device 8 be automatically controlled.

Therefore, the liquid mixer 7 constitutes a reactor and a buffer tank at the same time. Here the flow of beer compounded with a mixture of stabilization means and filter means is spun in the liquid mixer 7 in a manner such that the rate of reaction, of the stabilization means and of the filter means with the turbidity-removing substances and fine turbidities, can be multiplied. The upper half of the liquid mixer 7 is prestressed with $CO_2$ fed via the pipe 17 provided with a shut-off device 28 and attached to the cover of the apparatus 7. Due to the $CO_2$ prestress, pressure surges are buffered during the dosing operation.

The mixture of stabilization means and filter means is conveniently defined prior to the use, said substances being homogenized in a dry state. The mixtures thus homogenized are conveniently set in operation in order to eliminate mixing errors there.

The mixture is here composed of a maximum 50% parts by weight PVPP, a maximum 50% parts by weight silica gel, a maximum 75% parts by weight cellulose and a maximum 55% parts by weight synthetic fibers. The preferred amounts of the parts by weight are between 20 and 40 percent for PVPP, between 10 to 30% for silica gel, between 40 to 60% for cellulose, and from 5 to 25%, especially from 2 to 20%, for the synthetic fibers. It has become evident that such a mixture can also be used independently of a receding centrifugation in connection with other processes for secondary purification of beverages and especially beer. An addition of kieselguhrs with a maximum 75% parts by weight is possible.

We claim:

1. A mixture for the purification and stabilization of liquids consisting essentially of:
   polyvinylpyrrolidone, cellulose and synthetic fibers, wherein the polyvinylpyrrolidone does not exceed 50% by weight, the cellulose does not exceed 75% by weight and the synthetic fibers do not exceeding 75% by weight.

2. A mixture for the purification and stabilization of liquids according to claim 1, wherein said mixture further includes silica gel.

3. A mixture for the purification and stabilization of liquids according to claim 2, wherein the silica gel does not exceed 75% by weight.

4. A mixture for the purification and stabilization of liquids according to claim 2, wherein the silica gel does not exceed 50% by weight.

5. A mixture for the purification and stabilization of liquids having the following composition by weight:
   polyvinylpyrrolidone in an amount between 20% and 50%, silica gel in an amount between 10% and 75%, cellulose in an amount between 40% and 75% and synthetic fibers in an amount between 2% and 75%.

6. A mixture for purification and stabilization of liquids according to claim 5, wherein said mixture has the following ranges by weight 20% to 40% polyvinylpyrrolidone, 10% to 30% silica gel, 40% to 60% cellulose and 5% to 25% synthetic fibers.

7. A mixture for purification and stabilization of liquids according to claim 5, wherein said mixture has the following ranges by weight: 20% to 40% polyvinylpyrrolidone, 10% to 30% silica gel, 40% to 60% cellulose and 2% to 10% synthetic fibers.

8. A mixture for purification and stabilization of liquids having the following composition by weight:
   polyvinylpyrrolidone in an amount between 20% and 50%, cellulose in an amount between 40% and 75% and synthetic fibers in an amount between 2% and 75%.

9. A mixture for purification and stabilization of liquids according to claim 8, wherein the polyvinylpyrrolidone is between 20% and 40% inclusive, the cellulose is between 40% and 60% inclusive and the synthetic fibers is between 5% and 25% inclusive.

10. A mixture for the purification and stabilization of liquids according to claim 8, wherein said mixture further includes silica gel.

11. A mixture for the purification and stabilization of liquids according to claim 10, wherein the silica gel does not exceed 75% by weight.

* * * * *